(12) United States Patent
Matsumoto et al.

(10) Patent No.: US 6,301,577 B1
(45) Date of Patent: Oct. 9, 2001

(54) SIMILAR DOCUMENT RETRIEVAL METHOD USING PLURAL SIMILARITY CALCULATION METHODS AND RECOMMENDED ARTICLE NOTIFICATION SERVICE SYSTEM USING SIMILAR DOCUMENT RETRIEVAL METHOD

(75) Inventors: Kazunori Matsumoto, Ohmiya; Kazuo Hashimoto, Fujimi; Shigeki Muramatsu, Tokyo, all of (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/668,718

(22) Filed: Sep. 22, 2000

(30) Foreign Application Priority Data

Sep. 22, 1999 (JP) .................................................. 11-269528
Mar. 13, 2000 (JP) .................................................. 12-069478

(51) Int. Cl.[7] ..................................................... G06F 17/30
(52) U.S. Cl. .................................. 707/5; 707/104; 707/6; 706/14
(58) Field of Search ................................ 707/5, 1, 2, 3, 707/6, 10, 104; 725/9–14; 345/327; 706/14, 45

(56) References Cited

U.S. PATENT DOCUMENTS

| | | | | |
|---|---|---|---|---|
| 5,023,912 | * | 6/1991 | Segawa .................................. | 704/240 |
| 5,550,928 | * | 8/1996 | Lu et al. .............................. | 382/116 |
| 5,625,748 | * | 4/1997 | McDonough et al. ............... | 704/251 |
| 5,689,584 | * | 11/1997 | Kobayashi ........................... | 382/190 |
| 5,781,663 | * | 7/1998 | Sakaguchi et al. .................. | 382/189 |
| 5,812,998 | * | 9/1998 | Tsutumi et al. ......................... | 707/2 |
| 5,907,836 | * | 5/1999 | Sumita et al. ........................... | 707/2 |
| 5,977,964 | * | 11/1999 | Williams et al. ..................... | 345/327 |
| 5,999,893 | * | 12/1999 | Lynch, Jr. et al. ................... | 702/181 |
| 6,157,921 | * | 12/2000 | Barnhill ................................ | 706/16 |

OTHER PUBLICATIONS

Schroder et al "Interctive Learning and Probabilistic Retrieval in Remote Sensing Image Achives", IEEE 2000, pp. 2288–2298.*

Vasconcelos et al "A Bayesian Framework for Semantic Content Characterization", IEEE 1998, pp. 566–571.*

Leistensnider et al "A Simple Probabilistic Approach to Classification and Routing", IEEE 1997, pp. 750–754.*

"Hierarchical Bayesian Clustering for Automatic Text Classification", Iwayama, Makoto and Tokunaga, Takenobu, Proceedings of IJCAI–95, pp. 1322–1327, 1995.

Leistensnider et al "A simple probabilistic approach to classification and routing", IEEE 1997, pp. 750–754.*

* cited by examiner

Primary Examiner—Thomas Black
Assistant Examiner—Uyen Le
(74) Attorney, Agent, or Firm—Olson & Hierl, Ltd.

(57) ABSTRACT

A similar document retrieval method capable of realizing an improved retrieval performance. In this similar document retrieval method for retrieving similar documents of a reference document from a plurality of retrieval target documents, similarities of each one of the plurality of retrieval target documents with respect to the reference document are calculated by using each one of two or more similarity calculation methods separately, and the similar documents of the reference document are retrieved by carrying out a discrimination analysis with respect to each one of a plurality of similarities calculated by using each one of the two or more similarity calculation methods separately.

9 Claims, 11 Drawing Sheets

FIG.6

|  | AVERAGE PRECISION |
|---|---|
| simI | 0.4688 |
| simM | 0.0453 |
| simI+simM (EACH AXIS INDEPENDENT, SAME TRANSFORMATION) | 0.4628 |
| simI+simM (EACH AXIS INDEPENDENT, FOR EACH RETRIEVAL REQUEST) | 0.4810 |
| simI+simM (DISTORTION MINIMIZED) | 0.4943 |

FIG.7

TOP PAGE OF ARTICLE PROVIDING WWW SERVER (LINK)

[NATION]
■Two Dead, Four Injured in Shooting
■Girl Accused of Murdering Her Mom
■Hopes for World Peace at Y2K
 Summit (RECOMMENDED)
[POLITICS]
■Primary a Formality for Candidates
■State Polls on Presidential Race
■Campaign Round up
[SPORTS]
■Miller Tones It Down in First
 Game (RECOMMENDED)
■Olympic Officials Fear Train Woes
■Car Crushes into German Cyclists
[BUSINESS]
■Workers Say Internet is a Vital
 Tool (RECOMMENDED)
■Stores Cater to Pre-Teen Shoppers

[ECONOMY]
■Nasdaq Ends Up 28 : Dow Up 24
■Tokyo Stocks Close Lower
■Stocks Rise in Europe
■Dollar Higher, Gold Steady
[WORLD]
■Japan Slams U.S. Over Whaling
■Amnesty Reports on Palestinians
■Russia, Japan Vow To Work on Treaty
[HEALTH]
■Dietary Supplement No Substitute
■Computer Helps Children with Cancer
■Pollution Said Causing 3% of Deaths ■Labor Unions Turns to Cyberspace
■E-Commerce Start-Up for
 Boats Begins (RECOMMENDED) ···RECOMMENDED ARTICLE
(RETRIEVAL RESULT ACCORDING TO USER PROFILE)
 ···ANCHOR SELECTION

FIG.8

TOP PAGE OF ARTICLE PROVIDING WWW SERVER (LINK)

[TOP NEWS]
■Japan Slams U.S. Over Whaling (12:34)
■Amnesty Reports on Palestinians (10:19)
■Girl Accused of Murdering Her Mom (11:58)
■Two Dead, Four Injured in Shooting (11:56)
■Hopes for World Peace at Y2K Summit (11:32)

[RECOMMENDED NEWS]
■Hopes for World Peace at Y2K Summit
■Miller Tones it Down in First Game
■Workers Say Internet is a Vital Tool 

↖ ···ANCHOR SELECTION

FIG.9

| | TODAY'S RELATED ARTICLES |
|---|---|
| ------------------------------------------------- <br> [WORLD] JAPAN SLAMS U.S. OVER WHALING <br> ------------------------------------------------- <br><br> The highest ranking Japanese member of the International Whaling Commission declared Monday that slapping sanctions on his country for its whale research program world only backfire on the United States. <br><br> [ ADD TO PROFILE ] | |
| | THIS WEEK'S RELATED ARTICLES |

[ ADD TO PROFILE ]  ···THIS ARTICLE WILL BE ADDITIONALLY REGISTERED INTO USER PROFILE

 ···ANCHOR SELECTION

SIMILAR DOCUMENT RETRIEVAL METHOD USING PLURAL SIMILARITY CALCULATION METHODS AND RECOMMENDED ARTICLE NOTIFICATION SERVICE SYSTEM USING SIMILAR DOCUMENT RETRIEVAL METHOD

BACKGROUND OF THE INVENTION

1. Field of the Invention

The present invention relates to a method for retrieving similar documents of a reference document from a plurality of retrieval target documents, and a recommended article notification service system utilizing the similar document retrieval method.

2. Description of the Background Art

The well known retrieval models for retrieving similar documents include a vector space model such as tf·idf and a probabilistic model in which a similarity with respect to a retrieval requested document is expressed by a ratio of a relevant document probability and an non-relevant document probability with respect to a retrieval request. An example of the probabilistic model is disclosed in Iwayama et al.: "Hierarchical Bayesian Clustering for Automatic Text Classification", Proceedings of IJCAI-95, pp. 1322–1327, 1995, for example. When the vector space model and the probabilistic model are compared, the probabilistic model has a clearer meaning with respect to a value of the similarity (distance), and the probabilistic model is expected to have a superior precision at a time of clustering as shown by Iwayama et al. mentioned above, so that the probabilistic model is considered superior.

FIG. 1 is a graph showing a distribution of similar documents and dissimilar documents in the case where the similarities of a plurality of target documents are calculated in order to retrieve similar documents with respect to a given reference document, using the probabilistic model of Iwayama et al. In FIG. 1, the horizontal axis represents the similarity while the vertical axis represents a relative frequency, and black rectangle marks indicate a plot of the similarities of similar documents while white rectangle marks indicate a plot of the similarities of dissimilar documents. Note that this distribution was calculated using 10,000 target documents extracted from the Published Japanese Patent Applications between 1993 and 1999, with respect to 21 retrieval requests. Also, the comprehensive similarity Judgment for these 10,000 Published Japanese Patent Applications with respect to each retrieval request was made by experts.

As shown in FIG. 1, in the high similarity region such as a region with the similarity not greater than −1.0, there are hardly any dissimilar document so that the similar documents and the dissimilar documents can be separated almost completely. It can be seen that a distribution of the similar documents is flatter and more widespread compared with a distribution of the dissimilar documents. For this reason, there are many portions where the separation from the dissimilar documents is not realized very well because of the low similarities of some similar documents.

In the similar document retrieval using the probabilistic model of Iwayama et al. that is considered as a superior probabilistic model, the result of retrieval experiments using Iwayama et al's similarity measure can be analyzed in detail to reveal that, as can be seen in a graph of FIG. 5, the similar documents with relatively high similarities can be appropriately separated from the dissimilar documents, but there are many dissimilar documents at somewhat lower similarities so that the similar documents and the dissimilar documents coexist there, and they lowers the overall retrieval precision so that it is difficult to obtain the sufficient retrieval precision.

SUMMARY OF THE INVENTION

It is therefore an object of the present invention to provide a similar document retrieval method capable of realizing an improved retrieval performance by combining two or more similarities calculated by two or more different methods.

It is another object of the present invention to provide a recommended article notification service system utilizing this similar document retrieval method.

According to one aspect of the present invention there is provided a similar document retrieval method for retrieving similar documents of a reference document from a plurality of retrieval target documents, comprising the steps of: calculating similarities of each one of the plurality of retrieval target documents with respect to the reference document by using each one of two or more similarity calculation methods separately; retrieving the similar documents of the reference document by carrying out a discrimination analysis with respect to each one of a plurality of similarities calculated by using each one of the two or more similarity calculation methods separately.

According to another aspect of the present invention there is provided a recommended article notification service system for delivering mails describing recommended articles to users through Internet, comprising: a profile generation unit configured to generate a profile of each user; a recommended article selection unit configured to select the recommended articles from a plurality of articles in accordance with the profile of each user, by utilizing a similar document retrieval method, where the similar document retrieval method retrieves the recommended articles by calculating similarities of each one of the plurality of articles with respect to the profile of each user by using each one of two or more similarity calculation methods separately, and carrying out a discrimination analysis with respect to each one of a plurality of similarities calculated by using each one of the two or more similarity calculation methods separately; and a delivery unit configured to deliver a Web mail containing information of the recommended articles to each user through the Internet.

According to another aspect of the present invention there is provided a method for providing a recommended article notification service for delivering mails describing recommended articles to users through Internet, comprising: generating a profile of each user; selecting the recommended articles from a plurality of articles in accordance with the profile of each user, by utilizing a similar document retrieval method, where the similar document retrieval method retrieves the recommended articles by calculating similarities of each one of the plurality of articles with respect to the profile of each user by using each one of two or more similarity calculation methods separately, and carrying out a discrimination analysis with respect to each one of a plurality of similarities calculated by using each one of the two or more similarity calculation methods separately; and delivering a Web mail containing information of the recommended articles to each user through the Internet.

Other features and advantages of the present invention will become apparent from the following description taken in conjunction with the accompanying drawings.

BRIEF DESCRIPTION OF THE DRAWINGS

FIG. 6 is a diagram showing a table of average precision obtained for various combinations of similarities according to different models, in the second embodiment of the present invention.

FIG. 7 is a diagram showing one exemplary display layout of contents to be delivered in a mail magazine service according to the third embodiment of the present invention.

FIG. 8 is a diagram showing another exemplary display layout of contents to be delivered in a mail magazine service according to the third embodiment of the present invention.

FIG. 9 is a diagram showing an exemplary display of an article selected by a user on the display layout of FIG. 7 or FIG. 8 in a mail magazine service according to the third embodiment of the present invention.

DETAILED DESCRIPTION OF THE PREFERRED EMBODIMENTS

Referring now to FIG. 2 to FIG. 5, the first embodiment of a similar document retrieval method according to the present invention will be described in detail.

In the similar document retrieval method of the first embodiment, the multinomial distribution model is used in addition to the probabilistic model of Iwayama et al., such that the retrieval performance is improved by combining the similarity calculated by utilizing the probabilistic model of Iwayama et al. and the similarity calculated by utilizing the multinomial distribution model.

First, the principle of the similar document retrieval method of the first embodiment will be described with references to FIG. 2 and FIG. 3.

Figure 2:
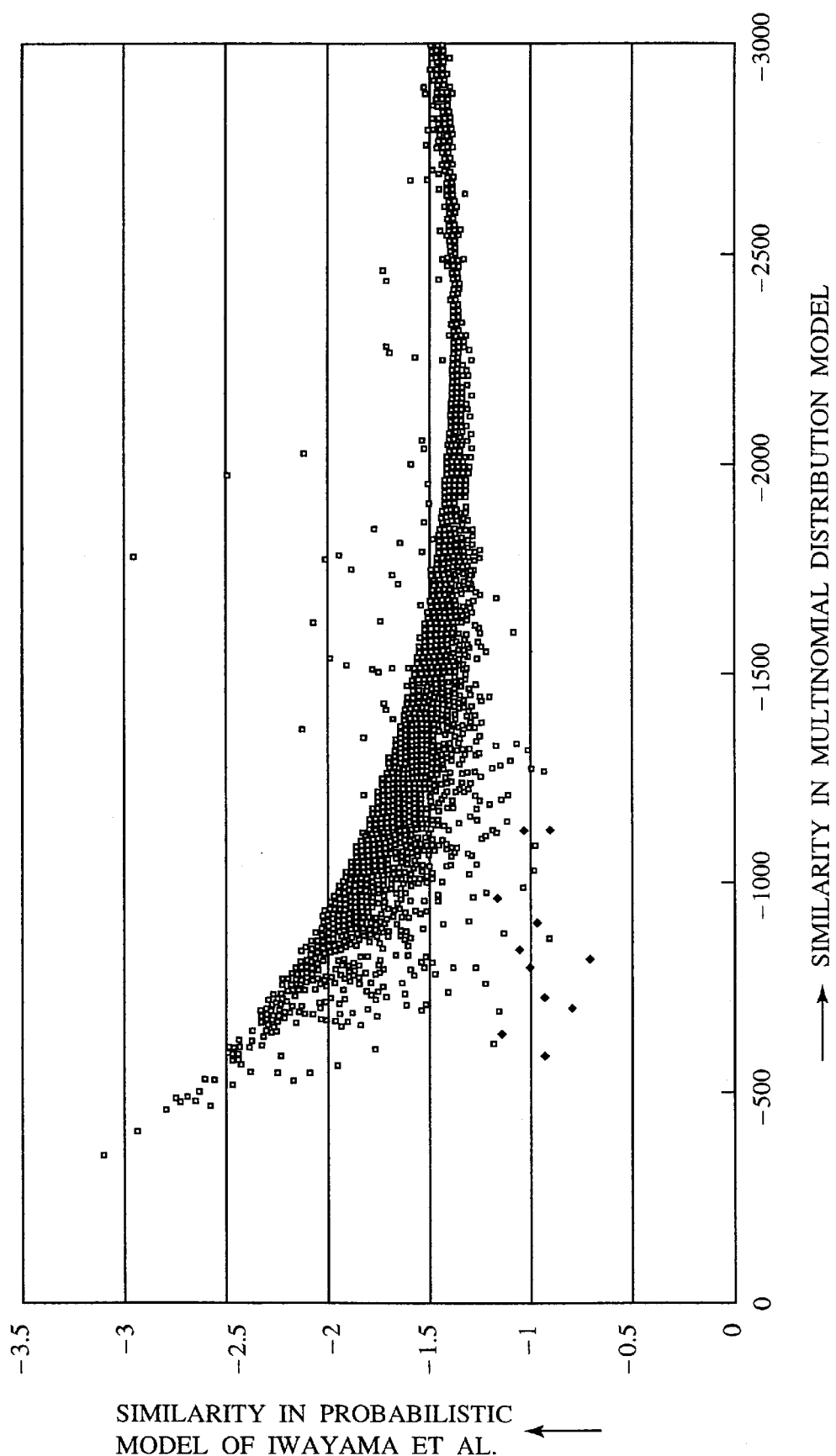
FIG. 2 is a graph showing a distribution of similar documents and dissimilar documents in a two dimensional feature space according to the present invention.

FIG. 2 shows a graph of a distribution of similar documents and dissimilar documents in a two-dimensional feature space formed by the similarity in the probabilistic model of Iwayama et al. and the similarly in the multinomial distribution model as feature quantities, that was obtained for each retrieval request, where the horizontal axis represents the similarity in the multinomial distribution model while the vertical axis represents the similarity in the probabilistic model of Iwayama et al. Also, in FIG. 3, black rectangle marks indicate the similarities of similar documents with respect to a reference document while white rectangle marks indicate the similarities of dissimilar documents with respect to a reference document.

Figure 3:
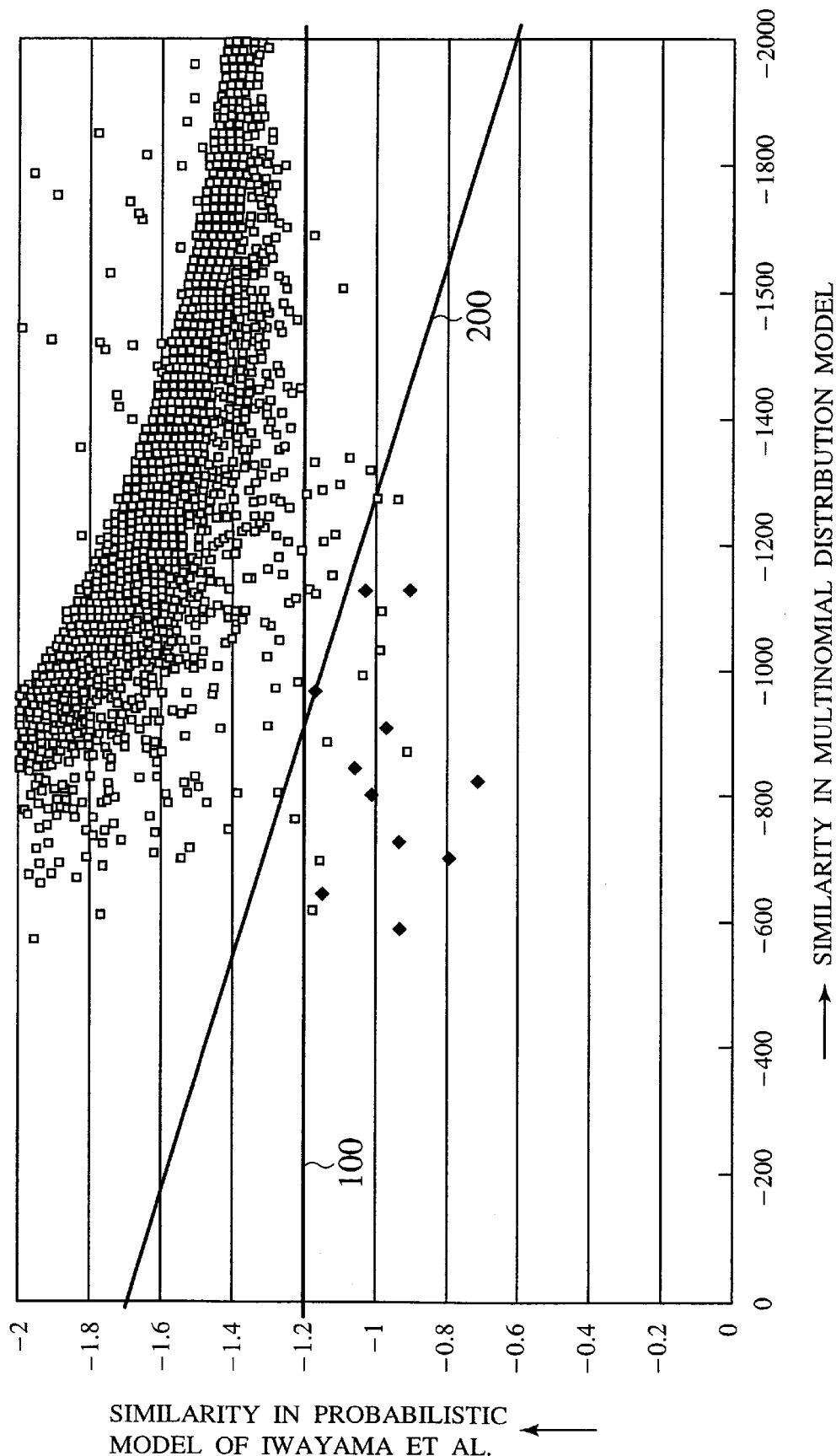
FIG. 3 is a graph showing a part of the graph of FIG. 2 in enlargement along with lines representing two exemplary linear discriminant functions.

FIG. 3 shows an enlarged view of a part of FIG. 2 centered around a portion containing many similar documents indicated by the black rectangle marks. As shown in FIG. 3, if a line 100 at the similarity in the probabilistic model of Iwayama et al. equal to −1.2 is used as a border, i.e., a threshold line, for discriminating the similar documents and the dissimilar documents, FIG. 3 indicates the retrieval result in which documents below this threshold line 100 are the similar documents while documents above this threshold line 100 are the dissimilar documents.

In FIG. 3, there are altogether 33 documents below the threshold line 100 of the similarity in the probabilistic model of Iwayama et al. equal to −1.2 that are judged as similar documents, which include 11 similar documents indicated by the black rectangle marks, i.e., correct documents, and 22 dissimilar documents indicated by the white rectangle marks, i.e., incorrect documents.

Namely, in the case of utilizing only the similarity in the probabilistic model of Iwayama et al., the documents judged as similar documents will contain more actually dissimilar documents than actually similar documents, so that it can be seen that the retrieval performance is rather poor.

In order to improve the retrieval performance further, the similar document retrieval method of the present invention combines the similarity in the multinomial distribution model with the similarity in the probabilistic model of Iwayama et al., and to this end, a combined threshold line 200 shown in FIG. 3 will be used as a threshold line for a combination of the similarity in the probabilistic model of Iwayama et al. and the similarity in the multinomial distribution model.

This combined threshold line 200 can be expressed as $y=-0.00055x-1.7$, where y stands for a value along the vertical axis and x stands for a value along the horizontal axis in FIG. 3. Note that, in this notation, the above described threshold line 100 can be expressed as $y=-1.2$.

In the similarity distribution shown in FIG. 3, when this combined threshold line 200 of $y=-0.00055x-1.7$ is used, documents above this combined threshold line 200 will be judged as dissimilar documents, while documents below this combined threshold line 200 will be judged as similar documents. In FIG. 3, there are altogether 20 documents below the combined threshold line 200 that are judged as similar documents, which include 11 similar documents indicated by the black rectangle marks, i.e., correct documents, and 9 dissimilar documents indicated by the white rectangle marks, i.e., incorrect documents.

Thus, it can be seen from this result that, in the similar document retrieval method of the present invention which utilizes both the similarity in the probabilistic model of Iwayama et al. and the similarity in the multinomial distribution model, the number of actually dissimilar documents contained in the documents judged as similar documents is significantly reduced from 22 to 9 compared with the conventional method of utilizing only the similarity in the probabilistic model of Iwayama et al., so that the retrieval performance is considerably improved.

As described, the present invention carries out the retrieval by judging similar documents by combining both the similarity in the probabilistic model of Iwayama et al. and the similarity in the multinomial distribution model. Note that the above described combined threshold line 200 of $y=-0.00055x-1.7$ is called a linear discriminant function.

Next, with reference to FIG. 4, the processing procedure for the similar document retrieval method of the first embodiment based on the above principle will be described.

Figure 4:
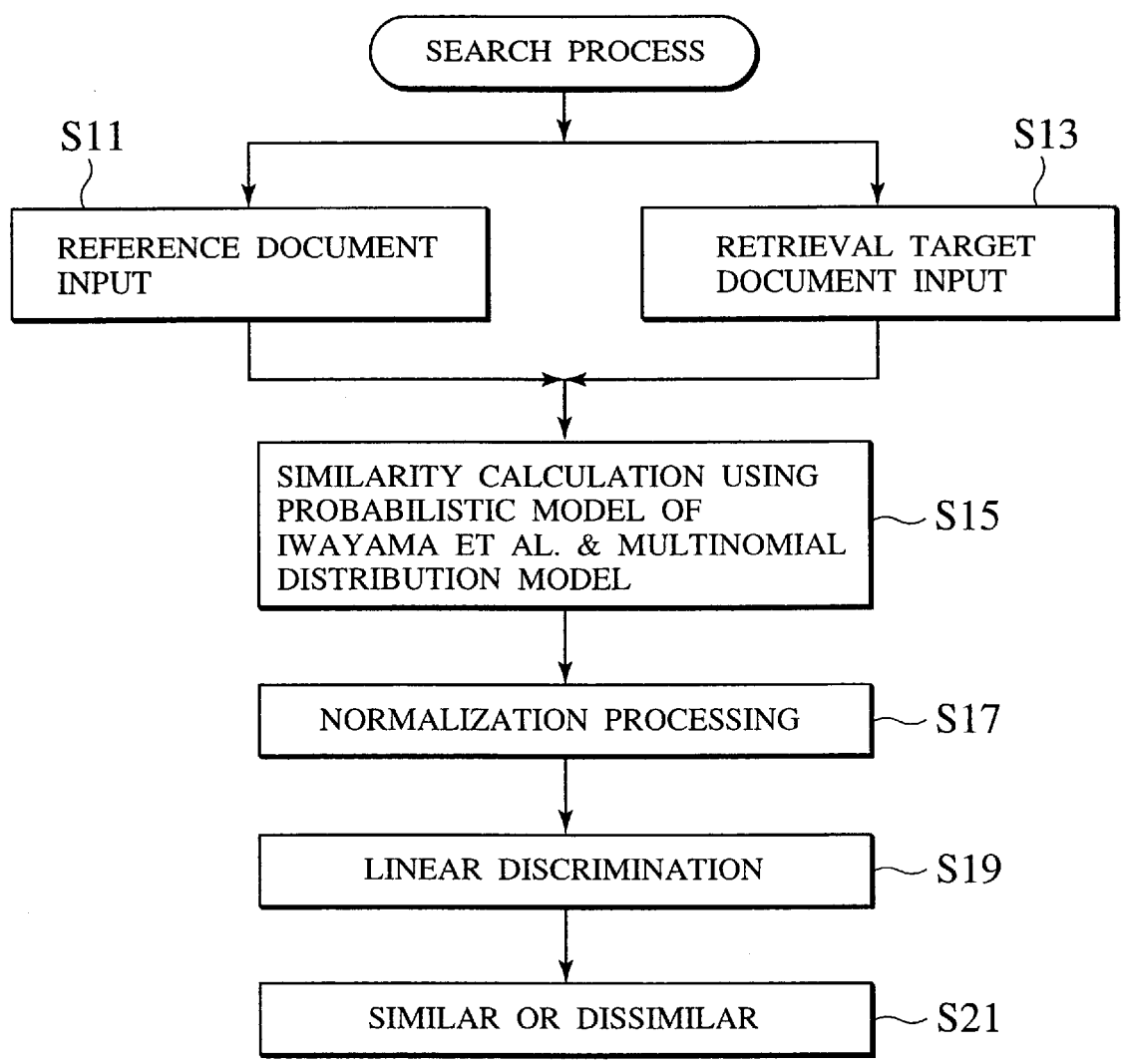
FIG. 4 is a flow chart showing a processing procedure of a similar document retrieval method according to the first embodiment of the present invention.

In the processing of FIG. 4, a reference document and a plurality of retrieval target documents are entered (steps S11, S13) in order to retrieval documents similar to the reference document from the plurality of retrieval target documents. Then, the similarity of each one of the plurality of retrieval target documents with respect to the entered reference document is calculated by the similarity calculation utilizing the probabilistic model of Iwayama et al. and the similarity calculation utilizing the multinomial distribution model as described above (step S15).

In this similarity calculation of the step S15, the similarity $P_i(c|d_x)$ of the retrieval target document c with respect to the reference document $d_x$ is calculated in the similarity calculation utilizing the probabilistic model of Iwayama et al. as follows.

$$P_i(c|d_x) = P(c) \sum_t \frac{P(t|c)P(t|d_x)}{P(t)}$$

where:

$P(t|d_x)$: An appearance probability of a term t in $d_x$, $P(t|c)$: An appearance probability of a term t in c, $P(t)$: An appearance probability of a term t in all retrieval target documents, and $P(c)$: A probability for $d_x$ to be contained in documents to be used as c (which will be set equal to 1 in the following).

Also, the similarity $P_m(c|d_x)$ of the retrieval target document c with respect to the reference document $d_x$ is calculated in the similarity calculation utilizing the multinomial distribution model as follows.

$$P_m(c|d_x) = {}_N C_{n(t1)} \times {}_{N-n(t1)} C_{n(t2)} \times \ldots \times \{P(t_1|c)\}^{n(t1)} \times \{P(t_2|c)\}^{n(t2)} \times \ldots$$

$$= \frac{N_x!}{n_x(t_1)! \times n_x(t_2)! \times \ldots} \times \{P(t_1|c)\}^{n(t1)} \times \ldots$$

where:

$N_x$: A sum of the number of appearances of all terms in $d_x$, and $n_x(t_i)$: The number of appearances of a term $t_i$ in $d_x$.

Also, both in the probabilistic model of Iwayama et al. and the multinomial distribution model, regardless of how $P(c|d_x)$ is calculated, the similarity $Sim(d_x, d_y)$ between a document $d_x$ and a document $d_y$ is calculated as follows.

$$Sim(d_x, d_y) = \frac{P(\{d_x, d_y\}|d_x) \cdot P(\{d_x, d_y\}|d_y)}{P(\{d_x\}|d_x) \cdot P(\{d_y\}|d_y)}$$

This gives the posterior probability by which the document $d_x$ and the document $d_y$ are correct when a cluster (document set) obtained by merging the document $d_x$ and the document $d_y$ is retrieved.

Next, each one of a plurality of similarities $P_i(c|d_x)$ according to the probabilistic model of Iwayama et al. and a plurality of similarities $P_m(c|d_x)$ according to the multinomial distribution model calculated at the step S15 is normalized (step S17), because they use different measures.

Then, the linear discrimination is carried out as a discrimination analysis with respect to these normalized similarities $P_i(c|d_x)$ according to the probabilistic model of Iwayama et al. and normalized similarities $P_m(c|d_x)$ according to the multinomial distribution model (step S19). This linear discrimination is carried out using the linear discriminant function y=−0.00055x−1.7 of the combined threshold line 200 described above, for example. Namely, in the linear discrimination utilizing this linear discriminant function y=−0.00055x−1.7, the retrieval target document c having the similarities $P_i(c|d_x)$ and $P_m(c|d_x)$ above the linear discriminant function y=−0.00055x−1.7 in the distribution shown in FIG. 3 will be judges as dissimilar to the reference document $d_x$ (step S21).

Figure 1:
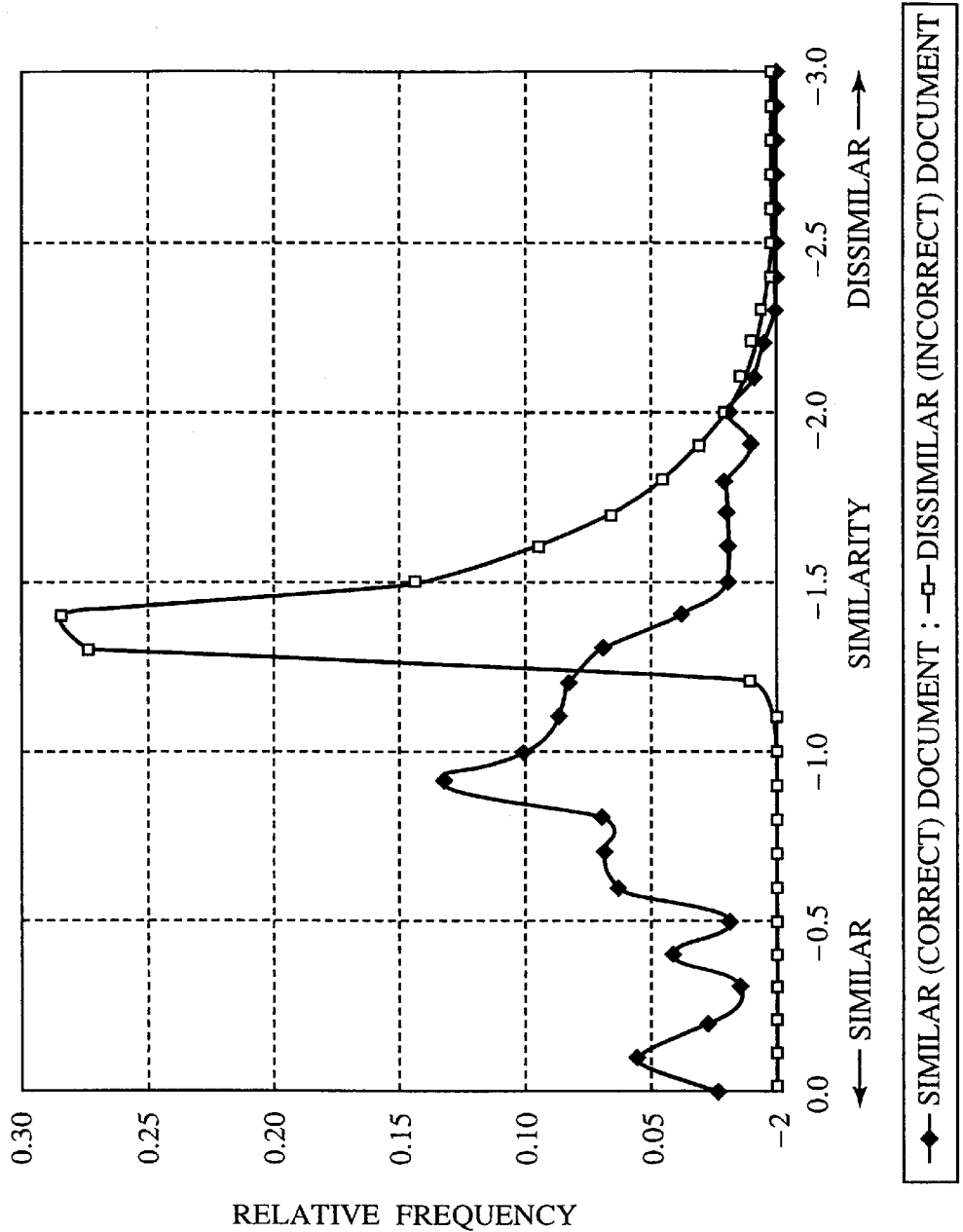
FIG. 1 is a graph showing a distribution of similar documents and dissimilar documents according to a conventional probabilistic model of Iwayama et al.
Figure 5:
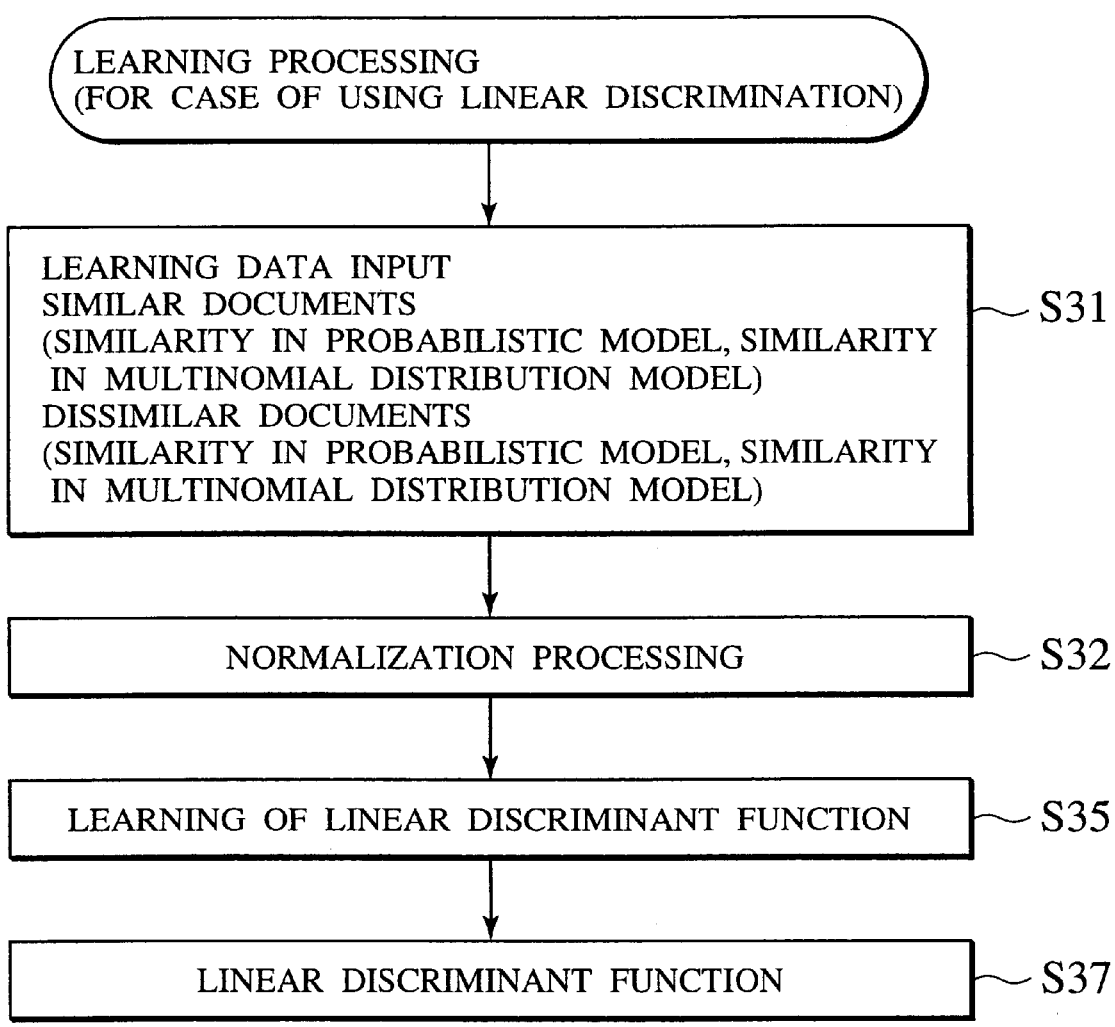
FIG. 5 is a flow chart showing a processing procedure for calculating a linear discriminant function to be used in the processing procedure of FIG. 4.

Next, with reference to FIG. 5, the processing for calculating the linear discriminant function utilized in the linear discrimination as the discrimination analysis of the step S19 in the processing of FIG. 1 will be described. This calculation of the linear discrimination function is carried out by the learning.

In the learning processing of FIG. 2, learning data are entered first (step S31). In this learning data input, the similarity according to the probabilistic model of Iwayama et al. and the similarity according to the multinomial distribution model of each one of the similar documents that are known to be similar to the reference document and the dissimilar documents that are known to be dissimilar to the reference document are entered as the learning data.

Then, these entered learning data are normalized (step S33), and the learning of the linear discriminant function using these normalized learning data is carried out (step S35) to calculate the linear discriminant function (step S37). The linear discriminant function so calculated is y=−0.00055x−1.7 described above, for example, and the linear discrimination at the step S19 of FIG. 1 is carried out using such a linear discriminant function.

Note that the first embodiment has been described for the case where the linear discrimination is used as the discrimination analysis, but the discrimination analysis is not necessarily limited to this case, and can be also realized by utilizing a neural network, a vector quantization, or a learning vector quantization (LVQ), for example.

Also, the first embodiment has been described for the case of carrying out the retrieval processing by combining two different similarities according to the probabilistic model of Iwayama et al. and the multinomial distribution model, but more than two different similarities can be combined if desired. Also, the similarity calculation is not necessarily limited to that utilizing the probabilistic model of Iwayama et al. and the multinomial distribution model, and any other model that can calculate the similarity can be used, but the probabilistic model of Iwayama et al. is currently regarded as having the best performance so that it is preferable to use this model.

Referring now to FIG. 6, the second embodiment of a similar document retrieval method according to the present invention will be described in detail.

In the case of extracting the similar documents with respect to a document given as a retrieval request from the retrieval target documents, the similarity is calculated using the discriminant function in the first embodiment. However, in practice, the similarity distribution may vary in a sophisticated way for each retrieval request, so that the discriminant function used in judging the similar documents may become inappropriate depending on the retrieval request. Namely, the discriminant function for discriminating relevant documents and non-relevant documents in the similar document retrieval can be different for different retrieval request documents.

For this reason, in the second embodiment, a distribution of the similarities (feature quantities) with respect to a given retrieval request is obtained by a pilot search once, then a linear transformation is applied to this distribution in such a way that the similarity distribution resembles the standard distribution model as much as possible, and then an optimal discriminant function with respect to the standard model is applied to the similarity distribution after this linear transformation.

More specifically, in the second embodiment, the following quantities are defined as a preparation.

Standard models: $M_1, M_2, \ldots$

Retrieval request document set used in $M_i$: $Q=[q_1, q_2, \ldots, q_m]$

Retrieval target documents: $D=\{d_1, d_2, \ldots, d_N\}$

Similarity measures: $X, Y, Z, \ldots$

Similarity between $q_i$ and $d_j$ using similarity measures $X, Y \ldots$: $SimX(q_i,d_j)$, $SimY(q_i,d_j)$, ... which will be denoted hereafter as: $X_{i,j}=SimX(q_i,d_j)$, $Y_{i,j}=SimY(q_i,d_j)$, $d_j)\equiv Y_{i,j}$, etc.

$$\text{Transformation matrix for } q: T(q) = \begin{pmatrix} a_q & b_q & c_q \\ d_q & e_q & f_q \end{pmatrix}$$
(in the two-dimensional case)

Optimal transformation matrix for q: $\overline{T(q)}$

Similarity distribution in original space: $\Theta(q_i)=\{(X_{i,1}, Y_{i,1}), (X_{i,2}, Y_{i,2}), \ldots\}$ Similarity distribution in transformed space: $\Theta'(q_i)=\{(X'_{i,1},Y'_{i,1}), (X'_{i,2},Y'_{i,2}), \ldots\}$ $$\text{where } \begin{pmatrix} X'_{i,j} \\ Y'_{i,j} \end{pmatrix} = \overline{T(q_i)} \begin{pmatrix} X_{i,j} \\ Y_{i,j} \\ 1 \end{pmatrix}$$

Reference vector set (execution result of SOM (Self-Organizing Map)): $R=\{r_1, r_2, \ldots\}$ Then, the standard models are produced. In this standard model production, the standard models $M_i(i=1, 2, \ldots)$ are repeatedly produced by the following procedure.

(1) $\Theta'=\phi$ (2) Repeat the following for $q_j(j=1, 2, \ldots)$.

1. Go to 7, if $j \neq 1$.

2. $\overline{T(q_1)} = \begin{pmatrix} \frac{1}{\sigma_X(q_1)} & 0 & \frac{\mu_X(q_1)}{\sigma_X(q_1)} \\ 0 & \frac{1}{\sigma_Y(q_1)} & \frac{\mu_Y(q_1)}{\sigma_X(q_1)} \end{pmatrix}$ 3. Obtain $\Theta'(q_1)$ by:

$$\begin{pmatrix} X'_{1,k} \\ Y'_{1,k} \end{pmatrix} = \overline{T(q_1)} \begin{pmatrix} X_{1,k} \\ Y_{1,k} \\ 1 \end{pmatrix} \quad (1 \leq k \leq N)$$

4. $\Theta = \Theta'(q_1)$

5. Obtain the reference vector set $R_i$ by executing SOM with respect to $\Theta$.

6. Return to 1.

7. Optimize $R_j$ by using $T(q_j)$.

8. Obtain $\Theta'(q_j)$ by:

$$\begin{pmatrix} X'_{j,k} \\ Y'_{j,k} \end{pmatrix} = \overline{T(q_j)} \begin{pmatrix} X_{j,k} \\ Y_{j,k} \\ 1 \end{pmatrix} \quad (1 \leq k \leq N)$$

9. $\Theta = \Theta + \Theta'(q_j)$

10. Obtain the reference vector set $R_i$ by executing SOM (self-Organizing Map) with respect to $\Theta$.

11. Return to 1.

After the standard models are produced as in the above, the following processing is carried out with respect to a new retrieval request (q).

(1) The pilot search with respect to the retrieval target document set $D=\{d_1, d_2, \ldots, d_N\}$ is carried out using the retrieval request document q, so as to obtain $X_{q,1}, X_{q,2}, \ldots, X_{q,N}; Y_{q,1}, Y_{q,2}, \ldots, Y_{q,N}$.

(2) The optimal transformation matrix in the case of using the reference vector of each model is obtained, and set the optimal transformation matrix for a model with the smallest distortion as the optical transformation matrix $T(q)$.

(3) $\Theta'(q)$ is obtained by:

$$\begin{pmatrix} X'_{q,i} \\ Y'_{q,i} \end{pmatrix} = \overline{T(q)} \begin{pmatrix} X_{q,i} \\ Y_{q,i} \\ 1 \end{pmatrix} \quad (1 \leq i \leq N)$$

(4) Documents of the retrieval target document set are ranked according to the discrimination function of the model with the smallest distortion and $\Theta'(q)$ Namely, in the similar document retrieval method of the second embodiment, when two different similarity calculation methods are to be utilized, for example, one retrieval request q for which the similarity distribution is standard is determined first, and the similarity between this retrieval request q and each one of the retrieval target documents d1, d2, ... is separately calculated using each similarity calculation method. The similarities between the retrieval request q and the retrieval target document $d_i$ obtained by respective methods are denoted as $X(q, d_i)$ and $Y(q, d_i)$. At this point, the similarity distribution in the original space is expressed as described above.

This similarity distribution is transformed into the similarity distribution in the transformed space described above by using the transformation matrix T(q) described above with respect to each point $(X_i, Y_i)$. This similarity distribution after the transformation will be denoted as $\Theta'(q)$.

In general, it is difficult to express $\Theta'(q)$ analytically, so that a set of reference vectors $R=\{r_1, r_2, \ldots\}$ is obtained by applying the vector quantization method for expressing $\Theta'(q)$ discretely, and these reference vectors are used as parameters of the standard model.

With respect to a new retrieval request q, the similarity distribution $\Theta(q)$ is obtained by calculating the similarities with respect to all the retrieval target documents d1, d2, ... for each similarity calculation method. Here, the transformation matrix T(q) is adjusted such that the similarity distribution $\Theta(q)$ obtained by applying the transformation matrix T(q) to the obtained similarity distribution will resemble the standard distribution $\Theta'(q)$ as much as possible.

Next, FIG. 6 shows a table summarizing the result of average precision obtained for various cases of using the similarity according to the probabilistic model of Iwayama et al. (denoted as simI) and the similarity according to the multinomial distribution model (denoted as simM) either singly or in combination.

In FIG. 6, there are three cases of combining simI and simM, in which the content of the normalization processing is different, including (1) the case where a standard transformation using mean and variance for all retrieval requests as axes is applied to each retrieval request (where the same transformation is carried out for all the retrieval requests), (2) the case where a standard linear transformation is applied to each axis independently according to mean and variance for each retrieval request, and (3) the case where the optimal linear transformation is applied for each retrieval request.

It can be seen from FIG. 6 that the precision in the case of not carrying out the adaptation for each retrieval request (the case of simI+simM (each axis independent, same transformation) in FIG. 6) can be lower than the precision in the case of using only the similarity according to the probabilistic model of Iwayana et al. (the case of simI in FIG. 6). However, the average precision is improved both in the case of applying the standard linear transformation to each axis independently according to mean and variance for each retrieval request (the case of simI+simM (each axis independent, for each retrieval request) in FIG. 6) and the case of applying the optimal linear transformation for each retrieval request (the case of simI+simM (distortion minimized) in FIG. 6).

This implies that the retrieval precision can be improved by carrying out the linear transformation with respect to the similarity distribution in such a way that the similarity distribution resembles the standard model as much as possible, at a time of normalizing the feature quantities.

Referring now to FIG. 7 to FIG. 11, the third embodiment directed to a case of applying the similar document retrieval method of the present invention to a mail magazine service will be described in detail, as an example of a recommended article notification service system utilizing the similar document retrieval method of the present invention.

In this mail magazine service, Web based free mail accounts for mail magazine readers are provided, and mails containing titles or the like of recommended articles customized to individual registered users are delivered for the convenience of readers and the added value of the mail magazine service provider.

This mail magazine service is realized by carrying out the initial profile acquisition, the user profile management, the selection of articles to be used as contents of mails to be delivered, the display layout of contents to be delivered, and the display of the selected articles, as follows.

(a) Initial Profile Acquisition

When a reader makes a user registration for free mails, an initial profile is acquired from the user's selection of preferred article genres or topics of interest from menu/headlines presented to the user based on user's answers to an accompanying questionnaire.

(b) User Profile Management

After the mail delivery based on the initial profile, the user profile is updated whenever necessary according to the feedback information from the user as described below.

(c) Selection of Articles to be Contents of Mails to be Delivered

Articles to be recommended to each user are selected according the user profile, by using the similar document retrieval method of the present invention, in order to rank the articles to be recommended to each user by accounting for the profile information, newly arrived important articles, etc.

(d) Display Layout of Contents to be Delivered

A display layout of a Web mail containing titles of the articles to be recommended to individual user is as shown in FIG. 7, for example, where a list of articles similar to the News Update column of the top page is displayed, and special marks are attached to the recommended articles customized to individual user. The preference of the user at a time of the registration may be utilized in arranging genres.

Another exemplary display layout of contents to be delivered is as shown in FIG. 8, where (at most N sets of) titles of the recommended news for each user can be displayed in an order of their ranks determined in relation to the profile, in addition to headlines of the top news at a time of delivery.

The display layout shown in FIG. 7 requires a clever layout but it can notify other newly arrived articles as well. Also, the display layout of FIG. 8 can present the displayed contents in a neat, easy-to-read format. In either case, a result of selection including the recommended articles can be reflected into the user profile.

(e) Display of Selected Articles

A body of an article selected by the user on the display of (d) above will be displayed as shown in FIG. 9, for example.

Note that, in FIG. 9, there is provided a button for confirming addition to the profile. This may make the operation tedious, but it can make the feedback information from the user more accurate and definite. Also, as shown in a right hand side column of FIG. 9, it is also possible to display links to related articles (that are similar in contents). However, such an option presupposes a display screen to be generated separately from an ordinary article display screen.

Next, the mail magazine service system for realizing this mail magazine service will be described.

This mail magazine service requires the following features to the mail magazine service system.

(1) A mail server for providing the free account service and an application server for this mail magazine service should be provided and operated separately.

(2) No coordination with the user management by the mail server is to be incorporated. However, (a copy of) the same user information as used in the mail server is to be regularly updated also in the application server.

(3) It should be possible to acquire contents such as newly arrived articles regularly even on the application server.

(4) In the case of allowing a user to select the number of times and timings of the mail forwarding, a server configuration that can account for load balancing should be adopted.

Figure 10:
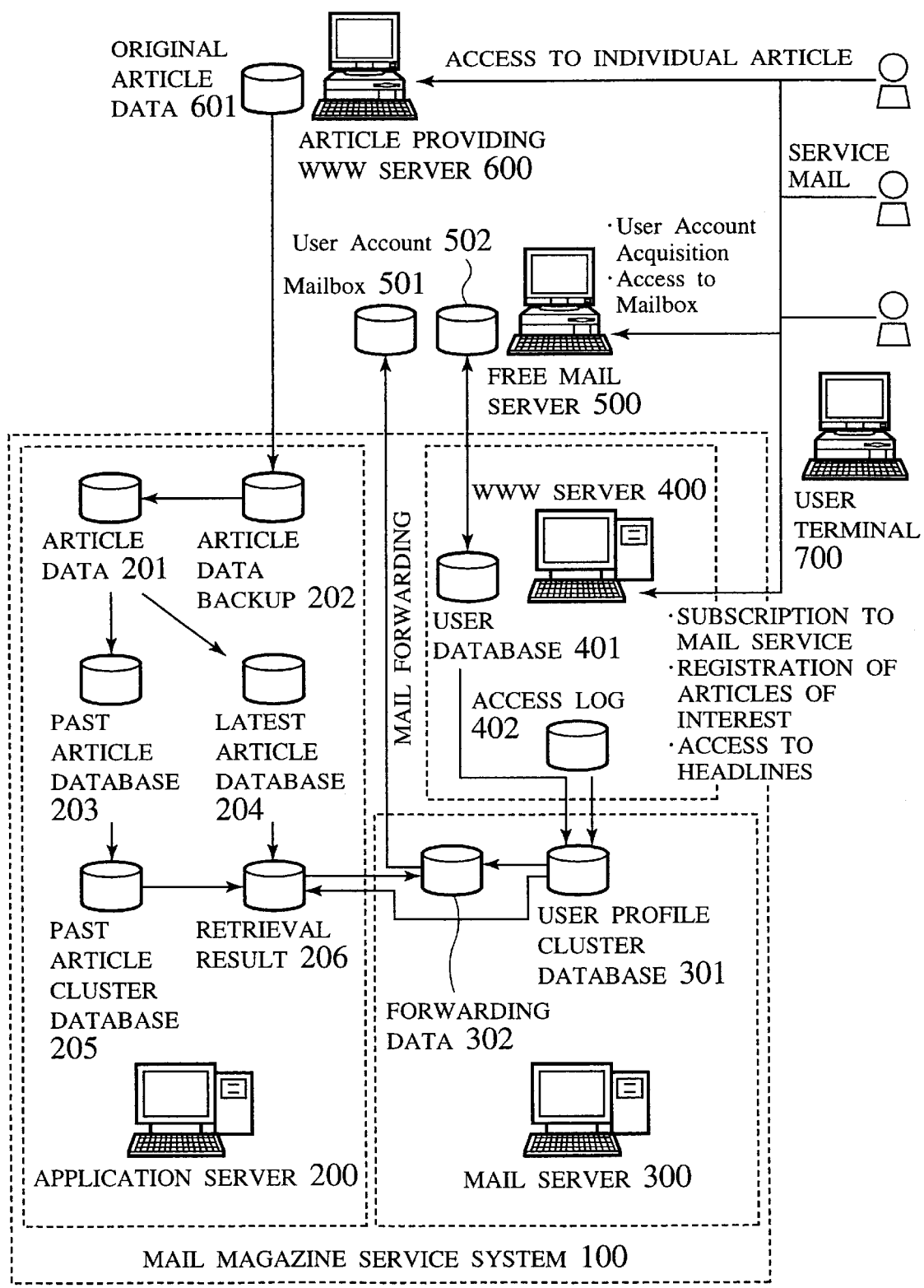
FIG. 10 is a block diagram showing an exemplary basic configuration of a mail magazine service system according to the third embodiment of the present invention.

FIG. 10 shows an exemplary basic configuration of the mail magazine service system in this embodiment. This mail service service system 100 comprises an application server 200, a mail server 300, and a WWW server 400.

The application server 200 contains article data 201, article data backup 202, a past article database 203, a latest article database 204, and a past article cluster database 205, and obtains the retrieval result 206 with respect to the article data 201 acquired from original article data 601 in an article providing WWW server 600.

The mail server 300 contains a user profile cluster database 301, and forwards mails containing forwarding data 302 to a Mailbox 501 of a free mail server 500.

The WWW server 400 contains a user database 401 according to user accounts 502 of the free mail server 500, and an access log 402.

A user terminal 700 is connected to the WWW server 400 at a time of subscription to the mail service, at a time of registration of articles of interest, and at a time of access to headlines. The user terminal 700 is connected to the free mail server 500 at a time of user account acquisition and at a time of access to the Mailbox 501. The user terminal 700 is connected to the article providing WWW server 600 at a time of access to individual articles.

Figure 11:
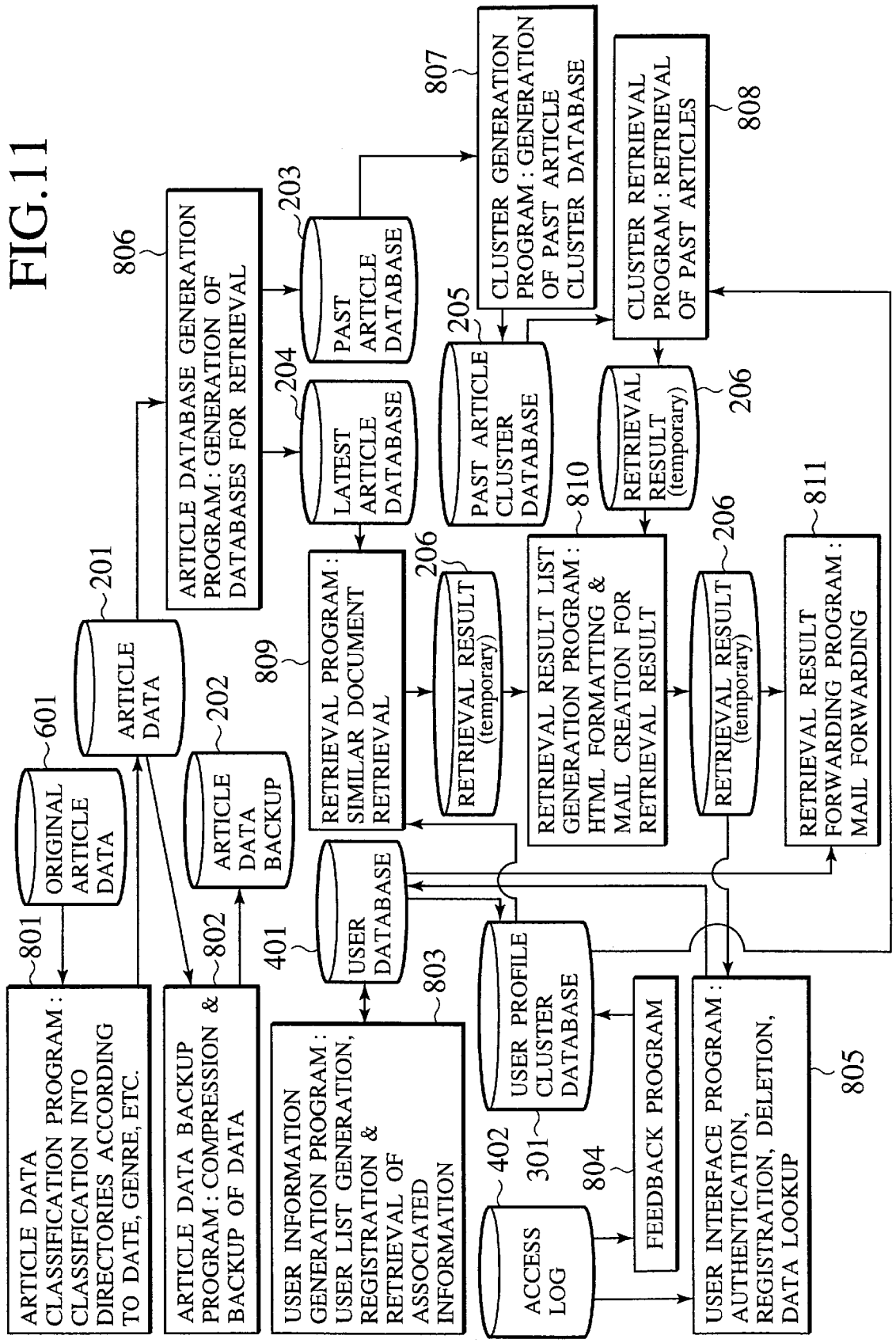
FIG. 11 is a diagram showing an exemplary module configuration for forming the mail magazine service system of FIG. 10 by using a group of programs.

FIG. 11 shows an exemplary module configuration in the case of forming the mail magazine service system of FIG. 10 by using a group of programs, including an article data classification program 801, an article data backup program 802, a user information generation program 803, a feedback program 804, a user interface program 805, an article database generation program 806, a cluster generation program 807, a cluster retrieval program 808, a retrieval program 809, a retrieval result list generation program 810, and a retrieval result forwarding program 811.

The article data classification program 801 classifies the original article data 601 into directories according to date, genre, etc., to obtain the article data 201.

The article data backup program 802 carries out compression and backup of the article data to obtain the article data backup 202.

The user information generation program 803 generates a user list and carries out the registration and the retrieval of associated information, according to the user database 401.

The feedback program 804 provides a feedback from the access log 402 to the user profile cluster database 301.

The user interface program 805 carries out authentication, registration, deletion, and data look up by using the access log 402, the user database 401, and the retrieval result 206.

The article database generation program 806 generates the latest article database 204 and the past article database 203 from the article data 201.

The cluster generation program 807 generates the past article cluster database 205 from the past article database 203.

The cluster retrieval program 808 carries out the retrieval of past articles from the past article cluster database 205 by using the user profile cluster database 301.

The retrieval program 809 carries out the similar document retrieval according to the present invention, using the latest article database 204 and the user profile cluster database 301.

The retrieval result list generation program 810 carries out the HTML formatting and the mail creation for the retrieval result 206 obtained by the cluster retrieval program 808 or the retrieval program 809.

The retrieval result forwarding program 811 carries out the mail forwarding for the retrieval result 206 obtained by the retrieval result list generation program 810, by using the user database 401.

In these configurations, a user who wishes to use free mails acquires an account from the mail server. Among the users who acquired accounts, those users who also wish to use the mail service as an option (the number of which is estimated to be about 1,000) also register profiles such as articles of interest.

The system regularly acquires new articles, retrieves articles in accordance with the user profile, and transfers the retrieval result to the mail server. The user can make an access to the mail server whenever convenient to the user, and refer to the contents in the Mailbox.

The service mail contains headlines in the HTML format, where each article provides a link to the article providing WWW server. The user can add any favorite article to the profile, The access log with respect to articles is managed at the system side.

As described above, according to the present invention, the similar documents of the reference document are extracted by calculating the similarity of each one of a plurality of retrieval target documents with respect to a reference document using each one of two or more similarity calculation methods separately, and carrying out the discrimination analysis with respect to a plurality of similarities that are separately calculated by using these two or more similarity calculation methods, so that it is possible to improve the retrieval precision considerably, compared with the conventional similar document retrieval method utilizing only the probabilistic model of Iwayama et al., for example, in which it has been difficult to achieve a sufficient retrieval precision.

In addition, according to the present invention, the similarity calculation method according to the probabilistic model of Iwayama et al. and the similarity calculation method according to the multinomial distribution model are combined, so that it is possible to improve the retrieval precision considerably, compared with the conventional similar document retrieval method utilizing only the probabilistic model of Iwayama et al., for example, in which it has been difficult to achieve a sufficient retrieval precision.

Moreover, according to the present invention, similarities calculated for the similar documents and the dissimilar documents by each similarity calculation method are entered as learning data, the discrimination analysis is learned using these learning data, and the discrimination analysis is carried out using a discriminant function obtained by this learning, so that it is possible to carry out the discrimination analysis in good precision.

Furthermore, according to the present invention, similarities calculated for the similar documents and the dissimilar documents by different similarity calculation methods are entered as learning data, the linear discrimination analysis is learned using these learning data, and the discrimination analysis is carried out using a linear discriminant function obtained by this learning, so that it is possible to carry out the discrimination analysis in good precision.

In addition, according to the present invention, the relevancy of the document is judged after applying the linear transformation for making the similarity distribution resemble the standard model as much as possible, for each retrieval request, so that it is possible to apply the optimal linear transformation for each retrieval request and classify relevant documents and non-relevant documents accurately even when the similarity distribution varies in a sophisticated manner for each retrieval request, and therefore it is possible to improve the retrieval precision.

Also, according to the present invention, recommended articles in accordance with the profile of each user are selected from many articles, and information containing these selected recommended articles is delivered through the Internet and presented to the user, while the user profile is updated according to the selection information returned from the user as a result of user selection made on the presentation, so that articles interesting to the user will be delivered to the user and therefore the user can view the information of interest without a failure, and even when the user's interest changes, it is always possible to present appropriate information to the user according to this change.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A similar document retrieval method for retrieving similar documents of a reference document from a plurality of retrieval target documents, comprising the steps of:

calculating similarities of each one of the plurality of retrieval target documents with respect to the reference document by using each one of two or more similarity calculation methods separately, the two or more similarity calculation methods including a first similarity calculation method for calculating a similarity according to a probabilistic model in which a similarity with respect to a retrieval target document is expressed by a ratio of a relevant document probability and a non-relevant document probability with respect to a retrieval request, and a second similarity calculation method according to a multinomial distribution model;

retrieving the similar documents of the reference document by carrying out a discrimination analysis with respect to each one of a plurality of similarities calculated by using each one of the two or more similarity calculation methods separately.

2. A method for providing a recommended article notification service for delivering mails describing recommended articles to users through Internet, comprising:

generating a profile for each user;

selecting the recommended articles from a plurality of articles in accordance with the profile of each user, by utilizing a similar document retrieval method, where the similar document retrieval method retrieves the recommended articles by calculating similarities of each one of the plurality of articles with respect to the profile of each user by using each one of two or more similarity calculation methods separately, and carrying out a discrimination analysis with respect to each one of the plurality of similarities calculated by using each one of the two or more similarity calculation methods separately, the two or more similarity calculation methods including a first similarity calculation method for calculating a similarity according to a probabilistic model in which a similarity with respect to a retrieval target document is expressed by a ratio of a relevant document probability and a non-relevant document probability with respect to a retrieval request, and a second similarity calculation method for calculating a similarity according to a multinomial distribution model; and delivering a Web mail containing information of the recommended articles to each user through the Internet.

3. The similar document retrieval method of claim 1, wherein the discrimination analysis is carried out by using a discriminant function which is obtained by a learning using similarities of each one of known similar documents and known dissimilar documents with respect to the reference document calculated by using each one of the two or more similarity calculation methods separately as learning data.

4. The similar document retrieval method of claim 1, wherein the discrimination analysis uses a linear discriminant function.

5. The similar document retrieval method of claim 4, wherein the linear discriminant function is obtained by a learning using similarities of each one of known similar documents and known dissimilar documents with respect to the reference document calculated by using each one of the two or more similarity calculation methods separately as learning data.

6. The similar document retrieval method of claim 1, wherein the retrieving step retrieves the similar documents of the reference document by applying a linear transformation on a distribution of the similarities calculated by the calculating step for each retrieval request such that the distribution of the similarities after the linear transformation resembles a standard model as much as possible, at a time of normalizing feature quantities given by the similarities calculated by the calculating step, and carrying out the discrimination analysis for discriminating relevant documents and non-relevant documents on a space defined by the feature quantities after the linear transformation.

7. A recommended article notification service system for delivering mails describing recommended articles to users through Internet, comprising:

a profile generation unit configured to generate a profile of each user;

a recommended article selection unit configured to select the recommended articles from a plurality of articles in accordance with the profile of each user, by utilizing a similar document retrieval method, where the similar document retrieval method retrieves the recommended articles by calculating similarities of each one of the plurality of articles with respect to the profile of each user by using each one of two or more similarity calculation methods separately, and carrying out a discrimination analysis with respect to each one of a plurality of similarities calculated by using each one of the two or more similarity calculation methods separately, the two or more similarity calculation methods including a first similarity calculation method for calculating a similarity according to a probabilistic model in which a similarity with respect to a retrieval target document is expressed by a ratio of a relevant document probability and a non-relevant document probability with respect to a retrieval request, and a second similarity calculation method for calculating a similarity according to a multinomial distribution model; and a delivery unit configured to deliver a Web mail containing information of the recommended articles to each user through the Internet.

8. The recommended article notification service system of claim 7, further comprising:

a profile update unit configured to update the profile of each user according to a selection information returned from each user as a result of each user's selection made upon presenting the information of the recommended articles to each user.

9. The recommended article notification service system of claim 8, wherein the profile generation unit generates an initial profile of each user according to information on each user's preferred article genres and topics of interest that is acquired from each user, and the profile update unit updates the initial profile of each user whenever necessary such that the profile of each user is always maintained in a state suitable for each user.

\* \* \* \* \*